United States Patent
Linder et al.

(10) Patent No.: US 12,180,435 B2
(45) Date of Patent: Dec. 31, 2024

(54) READY TO USE CLEANER/DISINFECTANT WIPE FOR CLEANING MEDICAL INSTRUMENTS COMPRISING A MIXTURE OF LOW AND HIGH HLB SURFACTANTS

(71) Applicant: AMERICAN STERILIZER COMPANY, Mentor, OH (US)

(72) Inventors: Jessica Sue Haney Boester Linder, Belleville, IL (US); Zachary Lincoln Strittmatter, St. Louis, MO (US); Nancy-Hope Elizabeth Kaiser, Collinsville, IL (US)

(73) Assignee: American Sterilizer Company, Mentor, OH (US)

( * ) Notice: Subject to any disclaimer, the term of this patent is extended or adjusted under 35 U.S.C. 154(b) by 558 days.

(21) Appl. No.: 17/524,897

(22) Filed: Nov. 12, 2021

(65) Prior Publication Data

US 2023/0151303 A1    May 18, 2023

(51) Int. Cl.
| | | |
|---|---|---|
| *C11D 1/835* | (2006.01) | |
| *C11D 1/62* | (2006.01) | |
| *C11D 3/20* | (2006.01) | |
| *C11D 3/30* | (2006.01) | |
| *C11D 3/37* | (2006.01) | |
| *C11D 17/04* | (2006.01) | |

(52) U.S. Cl.
CPC ............... *C11D 1/62* (2013.01); *C11D 3/201* (2013.01); *C11D 3/2048* (2013.01); *C11D 3/2068* (2013.01); *C11D 3/2086* (2013.01); *C11D 3/30* (2013.01); *C11D 3/3707* (2013.01); *C11D 17/049* (2013.01)

(58) Field of Classification Search
CPC .......... C11D 1/72; C11D 1/825; C11D 1/835; C11D 1/8355; C11D 3/042; C11D 3/044; C11D 3/10; C11D 3/201; C11D 3/30; C11D 3/43; C11D 3/48; C11D 7/261; C11D 9/12; C11D 17/041; C11D 17/049; C11D 2111/14; C11D 2111/16
See application file for complete search history.

(56) References Cited

U.S. PATENT DOCUMENTS

| | | | | |
|---|---|---|---|---|
| 5,962,388 | A | * 10/1999 | Sherry | .................. C11D 1/86 510/432 |
| 9,826,736 | B2 | 11/2017 | Napolitano et al. | |
| 2003/0073600 | A1 | * 4/2003 | Avery | ..................... C11D 3/48 510/382 |
| 2010/0206328 | A1 | 8/2010 | Dreilinger et al. | |
| 2014/0142197 | A1 | 5/2014 | Daigle et al. | |
| 2018/0002646 | A1 | * 1/2018 | Larson, III | ............... C11D 1/90 |

FOREIGN PATENT DOCUMENTS

WO    2013061082 A1    10/2012

OTHER PUBLICATIONS

International Search Report and Written Opinion for corresponding International Application PCT/US2022/047978, forms PCT/ISA/210 and PCT/ISA/237.

* cited by examiner

*Primary Examiner* — Charles I Boyer

(74) *Attorney, Agent, or Firm* — Hudak, Shunk & Farine Co. LPA

(57) ABSTRACT

A single-step absorbent wipe for cleaning and disinfecting medical instruments includes various active ingredients as well as compounds that increase the efficacy profile of the product against various organisms, improve the buffering capacity of the formulation, enhance the antimicrobial efficacy against mycobacteria, increases the wetting and cleaning profile of the formulation, as well as adjusts the PH thereof. The disinfectant wipe provides a procedure to suitably clean and intermediate level disinfect medical instruments that are heat liable as well as non-submersible.

13 Claims, 1 Drawing Sheet

ALUMINUM 1100
| | |
|---|---|
| Dry Control | 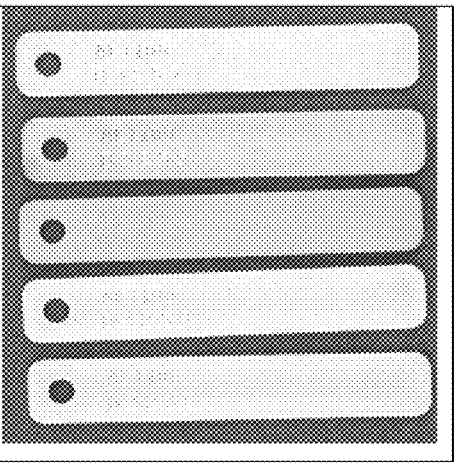 |
| Tap water control | |
| Commercially available Wipe solution (pH from SDS 11.0-12.5) | |
| Formula 2 | |
| Formula 1 | |
BRASS CDA443
| | |
|---|---|
| Dry Control | 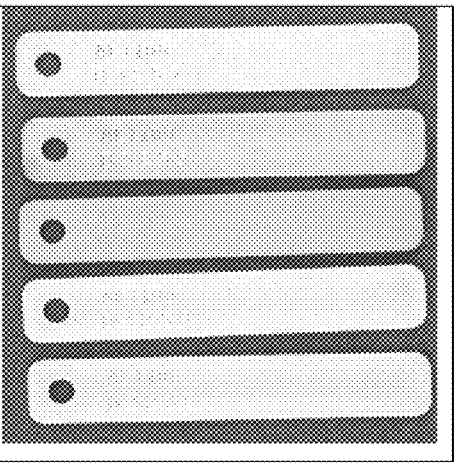 |
| Tap water control | |
| Commercially available Wipe solution (pH from SDS 11.0-12.5) | |
| Formula 2 | |
| Formula 1 | |
COPPER CDA110
| | |
|---|---|
| Dry Control | 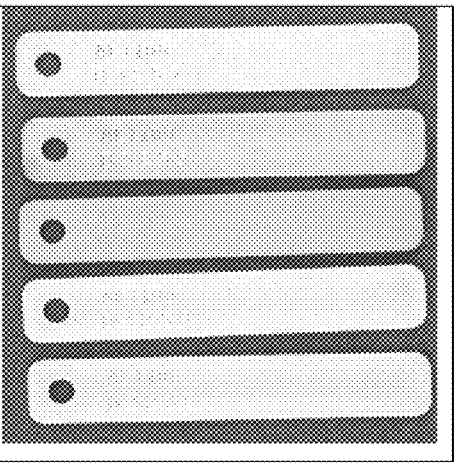 |
| Tap water control | |
| Commercially available Wipe solution (pH from SDS 11.0-12.5) | |
| Formula 2 | |
| Formula 1 | |

READY TO USE CLEANER/DISINFECTANT WIPE FOR CLEANING MEDICAL INSTRUMENTS COMPRISING A MIXTURE OF LOW AND HIGH HLB SURFACTANTS

FIELD OF THE INVENTION

A wipe impregnated with a chemistry solution is capable of achieving intermediate level disinfection within a short contact time and is capable of cleaning dried on soils. The wipe substrate is absorbent enough to hold and deliver sufficient liquid to thoroughly wet even large devices for the duration of the contact time but the wipe substrate does not absorb the active ingredients. The chemistry is specifically formulated with a moderate pH range of from about 8.5 to about 10.5.

BACKGROUND OF THE INVENTION

Healthcare customers working in the Central Services (CS) department are responsible for the reprocessing of the many instruments used in a healthcare setting. These instruments are received on the dirty side of the CS where they must be cleaned and disinfected before being delivered to the clean side of the CS for further processing. Typically, dirty instruments are placed in Washer/Disinfectors to go through cycles that include a cleaning phase to remove soil and a thermal rinse phase to provide intermediate level disinfection. These steps render the instrument clean and safe to handle on the clean side of the CS.

However, there are a number of heat-liable, non-submersible instruments that would be damaged by the conditions of conventional Washer/Disinfectors. These instruments must be cleaned by hand and then passed from the dirty side of the CS to the clean side through a pass-through window. This creates a need for a cleaner/disinfectant solution that is designed for use on medical devices to provide intermediate level disinfection.

Some of the currently marketed disinfectant wipe products are not one-step cleaner/disinfectors. There are many different wipe products available, but these products are not specifically labelled for use on non-submersible/heat liable medical devices. Additionally, various currently marketed products have a high pH such as from about 11.0 to about 12.5 which can negatively impact the safety profile for the user as well as the compatibility profile of the product with substrates common to medical devices.

SUMMARY OF THE INVENTION

The cleaner/disinfectant composition of the present invention has been formulated to be used for pass-through items in a Central Services department of hospitals. The formulation is designed to render instruments safe to handle on the clean side of the Central Services department. The wipe is impregnated with a chemistry solution that is capable of achieving intermediate level disinfection claims within a three-minute contact time and capable of cleaning dried on soils. Furthermore, the wipes of the present invention have the following advantages. It contains a mixture of quaternary ammonium chloride compounds of various chain lengths that allow for a broad spectrum of microbial disinfection; an alcohol co-solvent that confers broader efficacy profile and improves bioavailability of the quaternary ammonium active ingredient; an ether alcohol to enhance the antimicrobial efficacy of the product against mycobacteria; and wetting agents comprising a polyethylene glycol derivative of Cocamine having a high and low HLB value that improve the solubilization/removal of diverse soil types.

In general, a cleaner, disinfectant composition comprises a quaternary ammonium chloride disinfectant in an amount of from about 0.5 to about 3.0 wt. %; an ether alcohol comprising PPG-2 methyl ether, propylene glycol methyl ether acetate, dipropylene glycol dimethyl ether, propylene glycol phenyl ether, propylene glycol n-propyl ether, or butoxydiglycol, or any combination thereof, in an amount of from about 1.0 to about 5.0 wt. %; a wetting agent comprising ethoxylated alcohols and ethoxylated amines, independently, having from 1 to about 4 ethoxyl groups, amine oxides, block copolymers such as block copolymers of propylene oxide and ethylene oxide (20% EO), sorbitan esters, methyl esters, and PEG-2 Cocamine, or any combination thereof, having an HLB value of from about 4 to about 10 in an amount of from about 0.5 to about 3.0 wt. %; a wetting agent comprising ethoxylated alcohols and ethoxylated amines, independently, having from 7 to about 20 ethoxyl groups, ethoxylated amines, amine oxides, block copolymers such as block copolymers of propylene oxide and ethylene oxide (50% EO) polyoxyethylenated alcohol, sorbitan esters, methyl esters, and PEG-15 Cocamine, or any combination thereof, having a high HLB value of from about 11 to about 17 in an amount of from about 0.1 to about 1.0 wt. %; a short chain aliphatic alcohol having from 1 to about 3 carbon atoms in an amount of from about 35 to about 55 wt. %, and wherein the remainder is an amount of $H_2O$ that adds up to 100 wt. %.

BRIEF DESCRIPTION OF THE DRAWING

FIG. 1 illustrates the results of compatibility testing conducted on substrate coupons exposed to the indicated solution under static conditions for one week at room temperature.

DETAILED DESCRIPTION OF THE INVENTION

The ready-to-use wipes of the present invention allow for a one-step cleaning and intermediate level disinfection of heat-liable, non-submersible medical devices, generally prior to passing these instruments to the clean side of a Central Services department of a hospital, or other medical care institution or medical instrument supply company. The wipes are absorbent enough to hold and deliver sufficient liquid to thoroughly wet even large devices for the duration of the contact time and the wipe per se does not absorb any active ingredients. These and other advantages will become apparent from the following detailed description of the preparation of the ready-to-use cleaner/disinfectant wipes of the present invention.

The composition or formulation of the present invention is generally a finely tuned system of several components such as active disinfection compounds, a short chain aliphatic alcohol that boosts the efficacy profile against organisms, an alkalinity source, an ether alcohol that enhances the antimicrobial efficacy of the product against mycobacteria, wetting agents and cleaning profile compounds, as well as a pH adjuster.

Hereinafter, numerous compounds are set forth that comprise the formulation of the ready to use cleaner/disinfectant wipe product of the present invention. With respect to the various chemical compounds, the amount thereof is given in wt. % with the same of each individual compound being based upon 100 wt. %, or 100 parts by weight of the total composition formulation. Any active amount of a particular compound refers to the weight percent of active ingredient within the compound per se, that is the actual given weight percent of a compound utilized in the formulation of the present invention.

A suitable disinfect is various quaternary ammonium chlorides that are well known to the art and to the literature. A particularly useful active ingredient ammonium compound is a mixture by weight, of four quaternary ammonium chlorides as follows: 20% alkyl (C14 50%, C12 40%, C16 10%) dimethyl benzyl ammonium chloride, 15% octyl decyl dimethyl ammonium chloride, 6% dioctyl dimethyl ammonium chloride and 9% didecyl dimethyl ammonium chloride. This disinfectant has an active compound content of approximately 50% to 52% by weight and also contains approximately 10% by weight of ethyl alcohol with the remainder being water. This material is commercially available as Bardac 205M, manufactured by Lonza of Basel, Switzerland. It is EPA registered with respect to being a suitable hard surface disinfectant. In addition to these compounds, other suitable quaternary ammonium compounds include n-alkyl dimethyl ethylbenzyl ammonium chloride, n-akyl trimethyl ammonium chloride, dimethyloctadecyl [3-(trimethyoxsilylpropyl) ammonium chloride, or polymeric quaternary ammonium chlorides, or any combination thereof.

The total amount of the one or more quaternary compounds that is utilized in the present invention is generally from about 0.5 wt. % to about 3.0 wt. %, desirably from about 0.7 wt. % to about 2.5 wt. %, and preferably from about 0.8 wt. % to about 2.2 wt. %.

Another compound of the present cleaner/disinfectant wipe for intermediate level disinfection comprises a short chain aliphatic alcohol having from about 1 to about 3 carbon atoms such as methyl alcohol, ethyl alcohol, propyl alcohol, or isopropyl alcohol, wherein isopropyl alcohol is preferred, or any combination thereof. The purpose of the alcohol is to increase the efficacy profile of the wipe against certain organisms as well as improve the chemical and physical stability of the formulation. The alcohol is generally utilized in large amounts such as from about 35 to about 55 wt. %, desirably from about 40 to about 50 wt. %, and preferably from about 42 to about 48 wt. %. The alcohol is considered an active component of the wipe formulation or composition and generally exists in the noted high active amounts thereof, such as about 100 wt. %.

Optionally, but desirably, one or more alkalinity sources is utilized to boost the buffering capacity of the formulation in amounts of such as from about 0.1 to about 2.0 wt. %, desirably from about 0.2 to about 1.5 wt. %, and preferably from about 0.3 to about 1.0 wt. %. Examples of suitable alkalinity compounds include monoethanol amine, triethanol amine, hydroxide, potassium sodium hydroxide, calcium carbonate/bicarbonate, sodium carbonate/bicarbonate, 2-amino-2-methyl-1-propanol, or monoisopropanolamine, wherein monoisopropanolamine is preferred, or any combination thereof. Amounts in excess of the broad noted range generally caused the product to be outside the optimal pH range which can negatively impact the overall safety profile and compatibility profile of the product.

Another component of the cleaner/disinfectant wipe formulation of the present invention is an ether alcohol that enhances the antimicrobial efficacy of the product against mycobacteria. Suitable compounds include PPG-2 methyl ether, propylene glycol methyl ether acetate, dipropylene glycol dimethyl ether, propylene glycol phenyl ether, or propylene glycol n-propyl ether, wherein butoxydiglycol is preferred, or any combination thereof. Suitable amounts thereof generally range from about 1.0 to about 5.0 wt. %, desirably from about 2.5 to about 4.0 wt. %, and preferably from about 3.0 to about 3.5 wt. %. An excess of this material outside of the above ranges generally negatively impacts the products compatibility profile whereas an undercharge thereof will negatively impact the product's antimicrobial efficacy profile.

Wetting agents are desired since they contribute to the wetting and cleaning profile of the product. Suitable wetting agents generally have a high HLB (hydrophilic-lipophilic balance) of from about 11 to about 17 and preferably from about 14 to about 16. Such compounds include ethoxylated alcohols and ethoxylated amines, independently, having 7 to 20 and preferably from 9 to 15 ethoxyl groups, amine oxides such as Lauramine oxide and Cocamidopropyl amine oxide, block copolymers such as block copolymers of propylene oxide and ethylene oxide (50% EO), Poloxamer 235, Poloxamer 184, Meroxapol 105, Meroxapol 174, polyoxyethylenated alcohol (C9-11 Pareth 8), sorbitan esters, methyl esters, and PEG-15 Cocamine, or any combination thereof. A preferred high HLB wetting agent is PEG-15 Cocamine. Suitable amounts thereof generally range from about 0.1 to about 1.0 wt. %, desirably from about 0.1 to about 0.5 wt. %, and preferably from about 0.2 to about 0.4 wt. %. A significant undercharge can negatively impact the product's cleaning performance against polar soils. Moreover, it is noted that significant overcharges or undercharges can negatively impact the antimicrobial efficacy profile.

Another wetting agent that has a moderately low HLB (hydrophilic-lipophilic balance) are various compounds such as ethoxylated alcohols and ethoxylated amines, independently, having from 1 to 4 ethoxy groups, amine oxides such as Stearamine oxide, block copolymers propylene oxide and ethylene oxide (20% EO), Poloxamer 182, Poloxamer 101, Meroxapol 172, Meroxapol 252, polyether polyols, sorbitan esters, and methyl esters and the like with HLBs from about 4 to about 10, and desirably from 5 to about 7, or any combination thereof. A preferred low HLB compound is PEG-2 Cocamine. Suitable amounts thereof generally range from about 0.5 to about 3.0 wt. %, desirably from about 1.0 to about 2.0 wt. %, and preferably from about 1.2 to about 1.8 wt. %. Similar to the PEG-15 Cocamine, a significant undercharge can impact the product negatively with respect to cleaning performance thereof against non-polar soils. Moreover, overcharges or undercharges can also negatively impact the antimicrobial efficiency thereof.

With regard to the pH adjuster, generally many different types of pH adjusters can be utilized such as phosphoric acid, hydrocholoric acid, glycolic acid, oxalic acid, lactic acid, formic acid, and the like, or any combination thereof. A preferred pH adjuster is citric acid which can be supplied either in liquid form or as a 100% active solid powder. General amounts thereof are from about 0.025 to about 0.500 wt. %, desirably from about 0.050 to about 0.300 wt. %, and preferably from about 0.100 to about 0.25 wt. %. Significant overcharge of this material can cause a pH to be too low and thus negatively impact the product's antimicrobial efficacy profile. Moreover, undercharges can also cause the product pH to be elevated which can result in damage to delicate instrumentation and negatively impact the safety profile.

The remaining portion of the above-noted compounds that comprise Formula 1 of the present application is Deionized water as in an amount that add up to a total 100% or 100 total parts by weight, typically about 47.26 wt. % or parts by weight. However, in another embodiment, i.e. Formula 2 as set forth hereinbelow, hexylene glycol can be partially substituted for water, or a cosolvent in various suitable amounts such as approximately 7.5 wt. %.

With respect to the wipes, the one step cleaner disinfectant solution is saturated thereon to increase the ease of use of the product. The wipes are made of a non-cellulose based substrate to ensure the quaternary ammonium active ingredient is not adsorbed to the wipe. Examples of suitable materials of construction for the wipe are polyester, polypropylene, polyurethane, or similar materials, or any combination thereof, and the like. Additionally, the wipe substrate is manufactured to be 35 to 50 grams per square inch with an aperture pattern that allows for increased surface area. The higher weight of the wipe along with the aperture pattern helps to increase the amount of liquid the wipe can deliver. Alternatively, the disinfectant solution can be used to saturate a sponge made of non-cellulose material. Examples of suitable sponge materials of construction are polyester, polypropylene, or polyurethane, or similar materials, or any combination thereof, and the like.

The following formulations are preferred formulations of the various compounds of the present invention and it is to be understood that many variations thereof are also suitable.

Preferred wipe cleaner/disinfectant formulation

TABLE 1

| Material* | Formula 1 (as wt. %) | Formula 2 (as wt. %) |
|---|---|---|
| Deionized Water | 47.2600 | 40.4100 |
| Bardac 205M, 50% active | 2.0000 | 1.5000 |
| Monoisopropanolamine | 0.5000 | 0.5000 |
| PEG-15 Cocamine | 0.3000 | 0.1500 |
| PEG-2 Cocamine | 1.5000 | 1.5000 |
| Butoxydiglycol | 3.2500 | 3.2500 |
| Hexylene Glycol | 0.0000 | 7.5000 |
| Isopropyl Alcohol | 45.0000 | 45.0000 |
| Citric Acid | 0.1900 | 0.1900 |

*All compounds except for Bardac are 100% active.

The above invention will be better understood by reference to the following examples which serve to illustrate the present invention but not to limit the scope thereof.

Cleaning Study

A blood/protein-based soil was applied onto stainless steel coupons and allowed to dry at 50° C. for 1 hour. The coupons with dried soil were removed from the oven and allowed to cool to room temperature. Once cooled, the coupons were wiped with wipes saturated in the present invention or a commercially available competitive product. The amount of time required to completely remove the dried-on soil was recorded for three replicates. The results are reported as an average of the replicates. From the data it can be seen that Formula 1 was able to remove the soil more quickly than the currently available products. This is due to the superior surfactant system present in Formula 1

TABLE 2

| Product Used for Cleaning | Average time Required to Completely Remove 0.50 mL of Dried on Blood/Protein Soil (seconds) |
|---|---|
| Formula 1 | 26 |
| Competitive Product #1 | 33 |
| Competitive Product #2 | 33 |
| Competitive Product #3 | 60 |
| Competitive Product #4 | 32 |
| Competitive Product #5 | 33 |

The test method with regard to bacteria/fungal was according to AOAC official Method 961.02 whereas the virus testing was according to ASTM international test method designated E1053-20. *M. bovis* according to AOAC official Method 965.12.

TABLE 3

| Study Description | Product(s) Tested | Results | Notes |
|---|---|---|---|
| GLP *M. bovis* Qualitative Towelette Test | Formula 1: Formula 2: | Formula 1; *M. Bovis* All Lots = No Growth; passed<br>Formula 2; *M. Bovis* All Lots = No Growth; passed | Contact Time: 2 min 45 sec, dirty conditions |
| GLP Bacterial and Fungal Towelette Test | Formula 1: | *P. aeruginosa/S. aureus*: All Lots = No Growth; passed<br>MRSA: All Lots = No Growth; passed<br>VRE: All Lots = No Growth; passed<br>*T. interdigitale*: All Lots = No Growth; passed<br>*S. epidermidis*: All Lots = No Growth; passed<br>*E. cloacae*: All Lots = No Growth; passed<br>*S. marcescens*: All Lots = No Growth; passed<br>*M. yunnanensis*: All Lots = No Growth; passed<br>*B. cepcia*: All Lots = No Growth; passed<br>*S. pyogenes*: All Lots = No Growth; passed<br>*L. monocytogenes*: All Lots = No Growth; passed<br>*C. albicans*: All Lots = No Growth; passed | Contact Time: 2 min 45 sec, dirty conditions |
| GLP Viral Towelette Test | Formula 1: | HIV-1: passed<br>Influenza A2: passed<br>Adenovirus Type 2: passed<br>Avian Influenza Virus: passed<br>Poliovirus: passed<br>Duck Hepatitis B Virus: passed<br>Bovine Viral Diarrhea Virus: passed<br>Feline calicivirus: passed | Contact Time: 2 min 45 sec, dirty conditions |

Antimicrobial efficacy testing was conducted with Formula 1 by an independent, third-party testing laboratory. This testing was performed to establish the efficacy profile of Formula 1 over a broad spectrum of organisms included in the *mycobacterium*, gram-negative/gram-positive bacteria, fungi, and virus classes. All studies were performed under GLP using test methods recognized by the US Environmental Protection Agency (EPA) which certifies disinfectant products. The bactericidal/fungicidal testing was conducted according to AOAC official Method 961.02 whereas the viricidal testing was performed according to ASTM international test method designated E1053-20. The testing for the *mycobacterium* species was done according to AOAC official Method 965.12. From the testing result in Table 3, it is apparent that Formula 1 has the efficacy profile of an intermediate level disinfectant.

Efficacy Against *M. terrae*

Efficacy testing was conducted against commercially available products using *Mycobacterium terrae* as a surrogate for *Mycobacterium bovis* (target organisms for intermediate level disinfection claims.). Formula 1 was tested at its EPA Lowest Certified Limit (LCL) for each active ingredient.

Glass Slides inoculated with *M. terrea* under 5% organic soil conditions were wiped with the indicated product and allowed to dwell for the products label indicated contact time. After the contact time, the slides were placed in a neutralizer solution to quench the active ingredients. The neutralizer solution was filtered through a 0.2 μm filter which was incubated for 14 days at 37° C. The number of colonies present on the filters were counted. To Numerous To Count (TNTC) Designation for filters with greater than 200 Colony Forming Units (CFU).

Formula 1 shows no to low counts for each slide whereas the commercially available products show greater than 200 CFU on all or most of the slides. Formula 1 even outperforms the competitive products with longer contact times suggesting an overall superior efficacy profile.

commercially available wipe solution which caused visual damage to all three soft metals.

While in accordance with the Patent Statutes, the best mode and preferred embodiments have been set forth, the scope of the invention is not limited thereto, but rather, by the scope of the attached claims.

What is claimed is:

1. A cleaner, disinfectant composition, comprising:
 a quaternary ammonium chloride disinfectant in an amount of from about 0.5 to about 3.0 wt. %;
 an ether alcohol selected from the group consisting of PPG-2 methyl ether, propylene glycol methyl ether acetate, dipropylene glycol dimethyl ether, propylene glycol phenyl ether, propylene glycol n-propyl ether, or butoxydiglycol, or any combination thereof, in an amount of from about 1.0 to about 5.0 wt. %;
 a low HLB value wetting agent selected from the group consisting of ethoxylated alcohols and ethoxylated amines, independently, having from 1 to about 4 ethoxyl groups, amine oxides, block copolymers of propylene oxide and ethylene oxide (20% EO), polyether polyols, sorbitan esters, methyl esters, and PEG-2 Cocamine, or any combination thereof, having a low HLB value of from about 4 to about 10, in an amount of from about 0.5 to about 3.0 wt. %;
 a high HLB value wetting agent selected from the group consisting of ethoxylated alcohols and ethoxylated amines, independently having from 7 to about 20 ethoxyl groups, amine oxides, block copolymers of propylene oxide and ethylene oxide (50% EO), sorbitan esters, methyl esters, and PEG-15 Cocamine, or any combination thereof, having a high HLB value of from about 11 to about 17, in an amount of from about 0.1 to about 1.0 wt. %;
 a short chain aliphatic alcohol having from 1 to about 3 carbon atoms in an amount of from about 35 to about 55 wt. %;

TABLE 4

| | | | Product | | | | |
|---|---|---|---|---|---|---|---|
| Formula 1 (Replicate 1) | Formula 1 (Replicate 2) | Formula 1 (Replicate 3) | Competitive Product #1 | Competitive Product #2 | Competitive Product #3 | Competitive Product #4 | Competitive Product #5 |
| | | | Contact Time | | | | |
| 2.75 min | 2.75 min | 2.75 min | 3 min | 2 min | 2 min | 1 min | 10 min |
| | | | CFU on Filter after 14 day incubation | | | | |
| 1 | 0 | 0 | 0 | TNTC | TNTC | TNTC | TNTC | TNTC |
| 2 | 0 | 0 | 0 | TNTC | TNTC | TNTC | TNTC | TNTC |
| 3 | 0 | 0 | 0 | TNTC | TNTC | TNTC | TNTC | TNTC |
| 4 | 0 | 0 | 0 | TNTC | TNTC | TNTC | 2 | TNTC |
| 5 | 0 | 1 | 0 | TNTC | TNTC | TNTC | TNTC | TNTC |
| 6 | 0 | 0 | 0 | TNTC | TNTC | TNTC | TNTC | TNTC |
| 7 | 0 | 0 | 10 | TNTC | TNTC | TNTC | TNTC | TNTC |
| 8 | 0 | 14 | 0 | TNTC | TNTC | TNTC | 21 | TNTC |
| 9 | 1 | 0 | 4 | TNTC | TNTC | TNTC | TNTC | TNTC |
| 10 | 0 | 0 | 6 | TNTC | TNTC | TNTC | TNTC | TNTC |

Compatibility Testing

As shown in FIG. 1, compatibility testing was conducted with each substrate coupon exposed to the indicated solution under static conditions for one week at room temperature. Upon completion of the study, the wipe was removed, the coupon rinsed, and then observed for visual changes. The coupons exposed to Formula 1 and Formula 2 show no visual changes as compared to the coupons exposed to the an alkaline compound in an amount of from about 0.1 to about 2.0 wt. %, wherein said alkaline compound is selected from the group consisting of monoethanol amine, triethanol amine, potassium hydroxide, sodium hydroxide, calcium carbonate/bicarbonate, sodium carbonate/bicarbonate, 2-amino-2-methyl-1-propanol, or monoisopropanolamine, or any combination thereof; and a pH adjuster in an amount of from about 0.025 to about 0.5 wt. %, wherein said pH adjuster is selected from the group consisting of phosphoric acid, hydrocholoric acid, glycolic acid, oxalic acid, lactic acid, or formic acid, citric acid, or any combination thereof;
wherein the remainder is an amount of $H_2O$ that adds up to 100 wt. %, and
wherein the composition has a pH from about 8.5 to about 10.5.

2. The cleaner, disinfectant composition of claim 1, wherein said quaternary ammonium chloride disinfectant is selected from the group consisting of alkyl dimethyl benzyl ammonium chloride, octyl decyl dimethyl ammonium chloride, dioctyl dimethyl ammonium chloride, didecyl dimethyl ammonium chloride, n-alkyl dimethyl ethylbenzyl ammonium chloride, n-akyl trimethyl ammonium chloride, dimethyloctadecyl [3-(trimethyoxsilylpropyl) ammonium chloride, polymeric quaternary ammonium chlorides, or any combination thereof.

3. The cleaner, disinfectant composition of claim 1, wherein said quaternary ammonium chloride disinfectant comprises about 20% alkyl (C14 about 50%, C12 about 40%, C16 about 10%) dimethyl benzyl ammonium chloride, about 15% octyl decyl dimethyl ammonium chloride, about 6% dioctyl dimethyl ammonium chloride, and about 9% didecyl dimethyl ammonium chloride.

4. A cleaner, disinfectant composition, comprising:
a quaternary ammonium chloride disinfectant in an amount of from about 0.5 to about 3.0 wt. %, wherein said quaternary ammonium chloride disinfectant selected from the group consisting of alkyl dimethyl benzyl ammonium chloride, octyl decyl dimethyl ammonium chloride, dioctyl dimethyl ammonium chloride, didecyl dimethyl ammonium chloride, n-alkyl dimethyl ethylbenzyl ammonium chloride, n-akyl trimethyl ammonium chloride, dimethyloctadecyl [3-(trimethyoxsilylpropyl) ammonium chloride, polymeric quaternary ammonium chlorides, or any combination thereof;
an ether alcohol comprising butoxydiglycol in an amount of from about 1.0 to about 5.0 wt. %;
a low HLB value wetting agent comprising PEG-2 Cocamine, having a low HLB value of from about 4 to about 10, in an amount of from about 0.5 to about 3.0 wt. %;
a high HLB wetting value agent comprising PEG-15 Cocamine, having a high HLB value of from about 11 to about 17, in an amount of from about 0.1 to about 1.0 wt. %;
a short chain aliphatic alcohol having from 1 to about 3 carbon atoms in an amount of from about 35 to about 55 wt. %, wherein the short chain aliphatic alcohol comprises isopropyl alcohol;
an alkaline compound in the amount of from about 0.1 to about 2.0 wt. %, wherein the alkaline compound comprises monoisopropanolamine; and
a pH adjuster in an amount of from about 0.025 to about 0.5 wt. %, wherein said pH adjuster comprises said citric acid, and
wherein the remainder is an amount of $H_2O$ that adds up to 100 wt. %.

5. The cleaner, disinfectant composition of claim 4, wherein the amount of said quaternary ammonium chloride disinfectant is from about 0.7 to about 2.5 wt. %, wherein the amount of said short chain aliphatic alcohol having from 1 to about 3 carbon atoms is from about 40 to about 50 wt. %; wherein the amount of said monoisopropanolamine is from about 0.2 to about 1.5 wt. %, wherein the amount of said butoxydiglycol is from about 2.5 to about 4.0 wt. %, wherein the amount of said PEG-15 Cocamine is from about 0.1 to about 0.5 wt. %, wherein the amount of said PEG-2 Cocamine is from about 1.0 to about 2.0 wt. %, and wherein the amount of said citric acid is from about 0.5 to about 0.3 wt. %.

6. A cleaner, disinfectant composition, comprising:
a quaternary ammonium chloride disinfectant in an amount of from about 0.5 to about 3.0 wt. % comprising about 20% alkyl (C14 about 50%, C12 about 40%, C16 about 10%) dimethyl benzyl ammonium chloride, about 15% octyl decyl dimethyl ammonium chloride, about 6% dioctyl dimethyl ammonium chloride, and about 9% didecyl dimethyl ammonium chloride;
an ether alcohol comprising butoxydiglycol in an amount of from about 1.0 to about 5.0 wt. %;
a low HLB value wetting agent comprising PEG-2 Cocamine, having a low HLB value of from about 4 to about 10, in an amount of from about 0.5 to about 3.0 wt. %;
a high HLB value wetting agent comprising C9-11 Pareth-8, having a high HLB value of from about 11 to about 17, in an amount of from about 0.1 to about 1.0 wt. %;
a short chain aliphatic alcohol having from 1 to about 3 carbon atoms in an amount of from about 35 to about 55 wt. %, wherein said short chain aliphatic alcohol comprises isopropyl alcohol;
an alkaline compound comprising monoisopropanolamine; and
a pH adjuster that comprises citric acid, and
wherein the remainder is an amount of $H_2O$ that adds up to 100 wt. %.

7. The cleaner, disinfectant composition of claim 1, further comprising hexylene glycol in an amount of from about 0.25 to about 10 wt. %.

8. The cleaner, disinfectant composition of claim 2, further comprising hexylene glycol in an amount of from about 0.25 to about 10 wt. %.

9. The cleaner, disinfectant composition of claim 5, further comprising hexylene glycol in an amount of from about 2 to about 8 wt. %.

10. The cleaner, disinfectant composition of claim 1, wherein the amount of said quaternary ammonium chloride disinfectant is from about 0.7 to about 2.5 wt. %; wherein the amount of said high HLB value wetting agent is from about 0.1 to about 0.5 wt. %; wherein the amount of said low HLB value wetting agent is from about 1.0 to about 2.0 wt. %; wherein the amount of said ether alcohol is from about 2.5 to about 4.0 wt. %; and wherein the amount of said short chain aliphatic alcohol is from about 40 to about 50 wt. %.

11. The cleaner, disinfectant composition of claim 1, wherein the amount of said quaternary ammonium chloride disinfectant is from about 0.8 to about 2.2 wt. %; wherein the amount of said high HLB value wetting agent is from about 0.2 to about 0.4 wt. %; wherein the amount of said low HLB value wetting agent is from about 1.2 to about 1.8 wt. %; wherein the amount of said ether alcohol is from about 3.0 to about 3.5 wt. %; wherein the amount of said short chain aliphatic alcohol is from about 42 to about 48 wt. %, wherein the amount of said alkaline compound is from about 0.3 to about 1.0 wt. %, and wherein the amount of said pH adjuster is from about 0.1 to about 0.25 wt. %.

12. The cleaner, disinfectant composition of claim 6, wherein the amount of said quaternary ammonium chloride disinfectant is from about 0.7 to about 2.5 wt. %; wherein the amount of said high HLB value wetting agent is from about 0.1 to about 0.5 wt. %; wherein the amount of said low HLB value wetting agent is from about 1.0 to about 2.0 wt. %; wherein the amount of said ether alcohol is from about 2.5 to about 4.0 wt. %; wherein the amount of said short chain aliphatic alcohol is from about 40 to about 50 wt. %, wherein the amount of said alkaline compound is from about 0.2 to about 1.5 wt. %, and wherein the amount of said pH adjuster is from about 0.05 to about 0.3 wt. %.

13. The cleaner, disinfectant composition of claim 7, including hexylene glycol in an amount of from about 2 to about 8 wt. %, wherein the amount of said quaternary ammonium chloride disinfectant is from about 0.8 to about 2.2 wt. %; wherein the amount of said high HLB value wetting agent is from about 0.2 to about 0.4 wt. %; wherein the amount of said low HLB value wetting agent is from about 1.2 to about 1.8 wt. %; wherein the amount of said ether alcohol is from about 3.0 to about 3.5 wt. %; wherein the amount of said short chain aliphatic alcohol is from about 42 to about 48 wt. %, wherein the amount of said alkaline compound is from about 0.3 to about 1.0 wt. %, and wherein the amount of said citric acid is from about 0.1 to about 0.25 wt. %.

\* \* \* \* \*